(12) United States Patent
Lee et al.

(10) Patent No.: US 10,186,960 B2
(45) Date of Patent: Jan. 22, 2019

(54) POWER SUPPLY DETECTING EXTERNAL VOLTAGE DIVIDER CIRCUIT AND DRIVING METHOD THEREOF

(71) Applicant: SAMSUNG DISPLAY CO., LTD., Yongin, Gyeonggi-do (KR)

(72) Inventors: Seok Hwan Lee, Yongin-si (KR); Jong Jae Lee, Yongin-si (KR); Yang Uk Nam, Yongin-si (KR); Se Young Heo, Yongin-si (KR); Jun Ki Hong, Yongin-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/183,934

(22) Filed: Jun. 16, 2016

(65) Prior Publication Data

US 2017/0170726 A1    Jun. 15, 2017

(30) Foreign Application Priority Data

Dec. 9, 2015    (KR) .................... 10-2015-0175013

(51) Int. Cl.
*H02M 3/156*    (2006.01)
*G09G 3/20*    (2006.01)
(Continued)

(52) U.S. Cl.
CPC .......... *H02M 3/156* (2013.01); *G09G 3/2092* (2013.01); *H02M 1/08* (2013.01); *G09G 2310/0267* (2013.01); *G09G 2310/0275* (2013.01); *G09G 2310/08* (2013.01); *G09G 2330/028* (2013.01); *H02M 2001/0006* (2013.01); *H02M 2001/0025* (2013.01)

(58) Field of Classification Search
CPC . H02M 2001/0025; H02M 1/08; H02M 3/156
See application file for complete search history.

(56) References Cited

U.S. PATENT DOCUMENTS 5,874,827 A *    2/1999    Hashimoto ...... G01R 31/31924
                                                         323/234
2005/0212498 A1*    9/2005    Kubota ................. H02M 3/156
                                                         323/282
(Continued)

FOREIGN PATENT DOCUMENTS

WO    2006016319 A2    2/2006
WO    2012147139 A1    11/2012

OTHER PUBLICATIONS

Extended European Search Report for Application No. 16184706.6 dated May 10, 2017.

*Primary Examiner* — Jue Zhang
*Assistant Examiner* — Lakaisha Jackson
(74) *Attorney, Agent, or Firm* — Cantor Colburn LLP

(57) ABSTRACT

A power supply includes a voltage converter circuit which converts an input voltage into an output voltage and outputs the output voltage, a voltage controller which controls the voltage converter circuit in response to a first feedback voltage or a second feedback voltage, a feedback terminal which supplies the first feedback voltage, an internal voltage divider circuit which supplies the second feedback voltage, and a switch unit which transfers the first feedback voltage or the second feedback voltage to the voltage controller.

14 Claims, 6 Drawing Sheets

(51) Int. Cl.
*H02M 1/08* (2006.01)
*H02M 1/00* (2006.01)

(56) References Cited

U.S. PATENT DOCUMENTS

| | | |
|---|---|---|
| 2009/0140795 A1 | 6/2009 | Choy |
| 2011/0291575 A1* | 12/2011 | Shiu .................. H05B 33/0815 315/192 |
| 2014/0167719 A1* | 6/2014 | Chu ........................ H02M 3/07 323/282 |
| 2014/0176096 A1 | 6/2014 | Yamamoto |
| 2014/0362124 A1 | 12/2014 | Kim |
| 2015/0054801 A1 | 2/2015 | Seo et al. |

* cited by examiner

POWER SUPPLY DETECTING EXTERNAL VOLTAGE DIVIDER CIRCUIT AND DRIVING METHOD THEREOF

This application claims priority to Korean Patent Application No. 10-2015-0175013, filed on Dec. 9, 2015, and all the benefits accruing therefrom under 35 U.S.C. § 119, the content of which in its entirety is herein incorporated by reference.

BACKGROUND

1. Field

Exemplary embodiments relate to a power supply and a driving method thereof.

2. Description of the Related Art

In recent years, various display devices which reduce weight and volume that are disadvantages of cathode ray tubes are developed. Such display devices include a liquid crystal display device, a field emission display device, a plasma display device, an organic light emitting display device, etc., for example.

Such display devices generally include a power supply that converts external voltage and generates voltages for driving the display device.

The power supply includes a voltage divider circuit including multiple resistors. The power supply receives an output voltage as a feedback through the voltage divider circuit and controls a level of an output voltage.

SUMMARY

By controlling a resistance ratio of a voltage divider circuit equipped in a power supply, a scope of the output voltage may be controlled, but there is a limit to the scope of an output voltage that can change as a result.

Therefore, in order to additionally change the scope of the output voltage, it may be necessary to additionally install a separate voltage divider circuit on the outside of the power supply.

In an exemplary embodiment, a power supply may include a voltage converter circuit converting an input voltage into an output voltage and outputting the output voltage, a voltage controller controlling the voltage converter circuit in response to a first feedback voltage or a second feedback voltage, a feedback terminal supplying the first feedback voltage, an internal voltage divider circuit supplying the second feedback voltage, and a switch unit transferring the first feedback voltage or the second feedback voltage to the voltage controller.

In an exemplary embodiment, the power supply may further include a switch controller comparing the first feedback voltage with a reference voltage and controlling the switch unit based on the comparison result.

In an exemplary embodiment, the power supply may further include a current supply to supply a current to the feedback terminal.

In an exemplary embodiment, the switch controller may compare the first feedback voltage with the reference voltage primarily, and when the first feedback voltage is greater than the reference voltage, control the switch unit such that the second feedback voltage is transferred to the voltage controller.

Also, the switch controller may supply a current to the feedback terminal using the current supply when the first feedback voltage is smaller than the reference voltage, compare the first feedback voltage with the reference voltage secondarily, control the switch unit such that the first feedback voltage is transferred to the voltage controller when the first feedback voltage is greater than the reference voltage, and control the switch unit such that the second feedback voltage is transferred to the voltage controller when the first feedback voltage is smaller than the reference voltage.

In an exemplary embodiment, the switch unit may transfer the first feedback voltage to the internal voltage divider circuit which generates the second feedback voltage using the first feedback voltage.

In an exemplary embodiment, the second feedback voltage may be lower than the first feedback voltage.

In an exemplary embodiment, the switch unit may compare a first switch coupled between the voltage controller and the feedback terminal and transferring the first feedback voltage to the voltage controller when turned on, a second switch coupled between the feedback terminal and the internal voltage divider circuit and transferring the first feedback voltage to the internal voltage divider circuit when turned on and a third switch coupled between the internal voltage divider circuit and the voltage controller and transferring the second feedback voltage to the voltage controller when turned on.

In an exemplary embodiment, the switch controller may further include a comparator comparing the first feedback voltage with the reference voltage, a control switch supplying a feedback control signal having a first voltage to the switch unit when turned on, and a switch driver controlling an on-off state of the control switch based on the comparison result of the comparator.

In an exemplary embodiment, the current supply may include a current source supplying a current, a current control switch transferring a current supplied from the current source to the feedback terminal when turned on, and a current controller controlling an on-off state of the current control switch referring to a comparison result by the switch controller.

In an exemplary embodiment, a method for driving a power supply may include first comparing a first feedback voltage of a feedback terminal with a reference voltage primarily, and transferring a second feedback voltage to a voltage controller when the first feedback voltage is greater than the reference voltage based on the comparison from the first comparing.

In an exemplary embodiment, the method may further include supplying a current to the feedback terminal when the first feedback voltage is smaller than the reference voltage based on the comparison from the first comparing, second comparing the first feedback voltage with the reference voltage secondarily after the current is supplied to the feedback terminal, and transferring the first feedback voltage to the voltage controller when the first feedback voltage is greater than the reference voltage based on the comparison result from the second comparing.

In an exemplary embodiment, the method may further include transferring the second feedback voltage to the voltage controller when the first feedback voltage is smaller than the reference voltage based on the comparison result from the second comparing.

In an exemplary embodiment, the second feedback voltage may be generated through a voltage divider circuit, the voltage divider circuit may include multiple resistors coupled in series and may receives the first feedback voltage.

In an exemplary embodiment, the second feedback voltage may be lower than the first feedback voltage.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this invention will be thorough and complete, and will fully convey the scope of the example embodiments to those skilled in the art.

FIG. 5 illustrates another embodiment of a switch unit according to.

DETAILED DESCRIPTION

Figure 1:
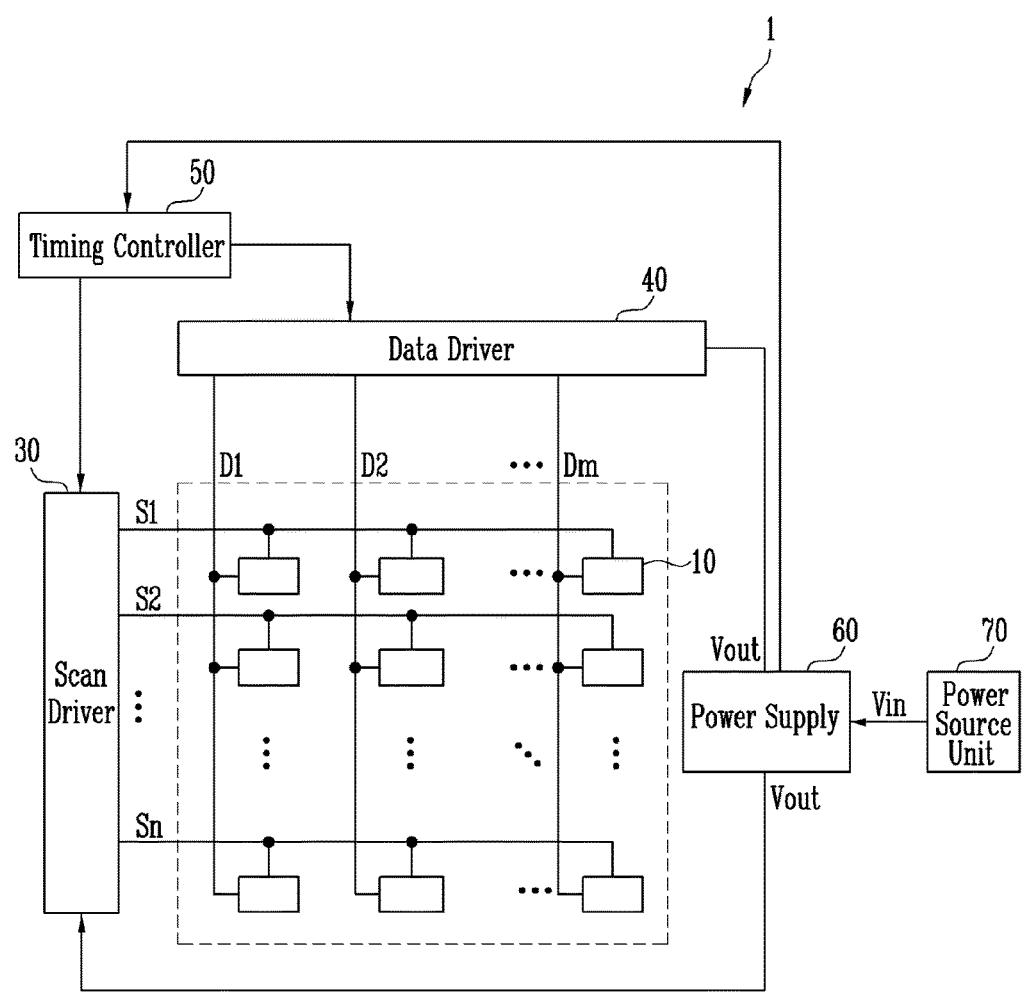
FIG. 1 illustrates an exemplary embodiment of a display device which has adopted a power supply according to the invention.

In the following detailed description, only certain exemplary embodiments of the invention have been shown and described, simply by way of illustration. As those skilled in the art would realize, the described embodiments may be modified in various different ways, all without departing from the spirit or scope of the invention. Accordingly, the drawings and description are to be regarded as illustrative in nature and not restrictive. In addition, it will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section, a second element, component, region, layer or section could be termed a first element, component, region, layer or section, and so forth, without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a display device which has adopted a power supply according to an exemplary embodiment.

Referring to FIG. 1, a display device 1 may include multiple pixels 10, a scan driver 30, a data driver 40, a timing controller 50, and a power supply 60.

The pixels 10 may be coupled to scan lines S1 to Sn and data lines D1 to Dm, where n and m are natural numbers greater than 1.

Accordingly, the pixels 10 may be supplied with scan signal via the scan lines S1 to Sn and may be supplied with data signal via the data lines D1 to Dm.

The scan driver 30 may generate scan signal by control of the timing controller 50 and may supply the generated scan signal to the pixels 10 via the scan lines S1 to Sn.

The data driver 40 may generate data signal by control of the timing controller 50 and may supply the generated data signal to the pixels 10 via the data lines D1 to Dm.

The timing controller 50 may control the scan driver 30 and the data driver 40.

When the scan signal is supplied to a certain scan line, the pixels 10 coupled to the certain scan line may be supplied with data signal transferred from the data lines D1 to Dm and may emit light having a brightness corresponding to the supplied data signal.

The power supply 60 may provide a voltage necessary for driving the display device 1.

In an exemplary embodiment, but without limitation thereto, the power supply 60 may convert an input voltage Vin input from outside into an output voltage Vout, and the output voltage Vout may be supplied to at least a portion of the scan driver 30, the data driver 40, and the timing controller 50, for example.

Also, though not illustrated, the power supply 60 may provide the output voltage Vout to, not only the scan driver 30, the data driver 40 and the timing controller 50, but also to other components included in the display device 1.

The input voltage Vin may be provided by a power source unit 70. In an exemplary embodiment, but without limitation thereto, the power source unit 70 may be a battery that provides direct current power or a rectifier that converts an alternating current power into a direct current power and outputs it, for example, but it is not limited thereto.

Figure 2:
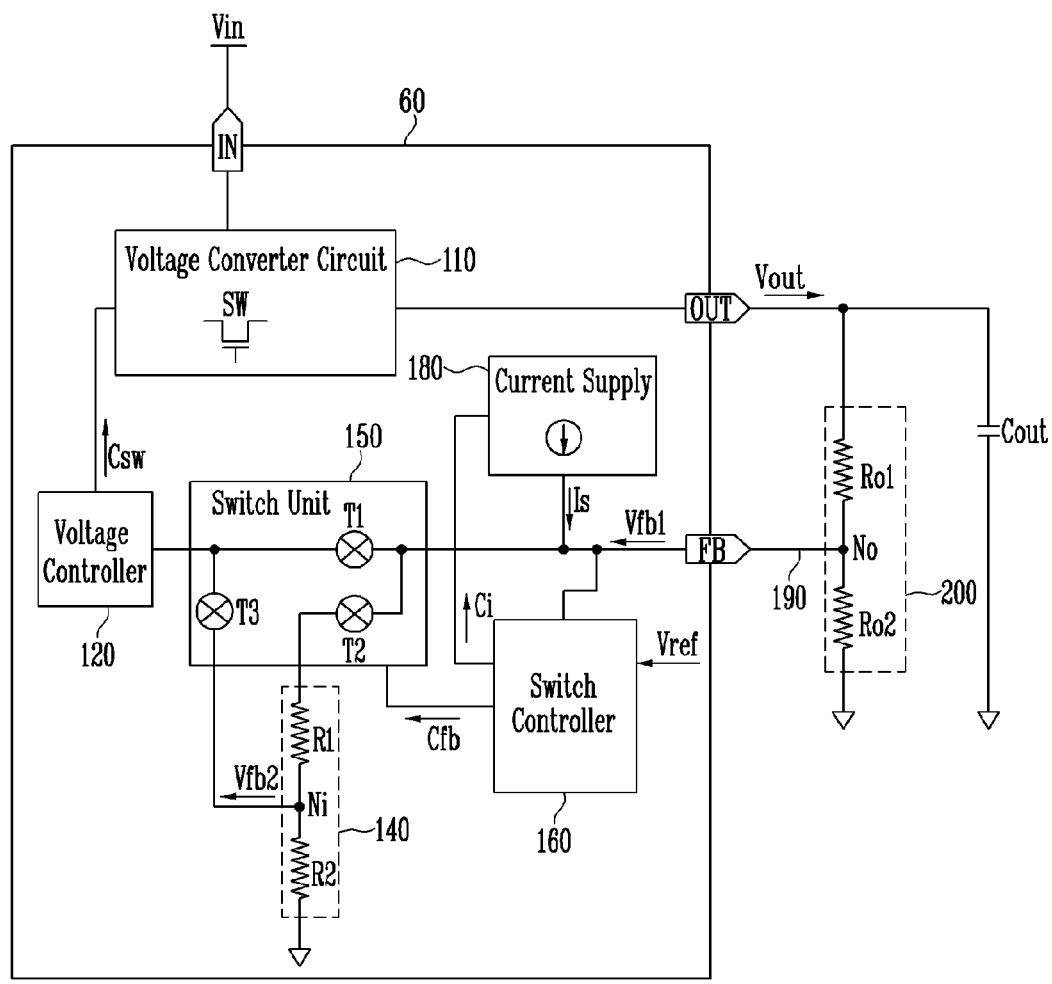
FIG. 2 illustrates an exemplary embodiment of a power supply according to the invention.

FIG. 2 illustrates a power supply according to an exemplary embodiment.

A power supply 60 according to an exemplary embodiment may convert an input voltage Vin that is input via an input terminal IN into an output voltage Vout. The output voltage Vout may be output via an output terminal OUT.

A capacitor Cout for maintaining the output voltage Vout may be coupled to the output terminal OUT of the power supply 60.

Also, when necessary, an external voltage divider circuit 200 may be coupled to the output terminal OUT of the power supply 60.

The external voltage divider circuit 200 may generate a first feedback voltage Vfb1 by dividing the output voltage Vout.

To this end, the external voltage divider circuit 200 may include multiple resistors Ro1 and Ro2 mutually coupled in series.

In an exemplary embodiment, but without limitation thereto, when the external voltage divider circuit 200 is installed, a node No between the resistors Ro1 and Ro2 may be coupled to a feedback terminal FB of the power supply 60, for example.

When the external voltage divider circuit 200 is not installed at the output terminal OUT of the power supply 60, the feedback terminal FB of the power supply 60 may be electrically coupled to the output terminal OUT.

Here, a first feedback voltage Vfb1 that the feedback terminal FB provides may have a voltage that is the same as the output voltage Vout.

The power supply 60 according to an exemplary embodiment may detect whether there exists the external voltage divider circuit 200 and may selectively use the first feedback voltage Vfb1 or a feedback voltage (e.g., a second feedback voltage Vfb2) generated by an internal voltage divider circuit 140.

Referring to FIG. 2, the power supply 60 according to an exemplary embodiment may include a voltage converter circuit 110, a voltage controller 120, a feedback terminal FB, an internal voltage divider circuit 140, a switch unit 150, a switch controller 160 and a current supply 180.

The voltage converter circuit 110 may convert the input voltage Vin into the output voltage Vout and output it.

In an exemplary embodiment, but without limitation thereto, the input voltage Vin may be input to the voltage converter circuit 110 through the input terminal IN of the power supply 60, and the output voltage Vout may be output to outside through the output terminal OUT of the power supply 60, for example.

The voltage converter circuit 110 may include at least one switch SW in order to perform voltage conversion operation.

The switch SW of the voltage converter circuit 110 may be controlled depending on a switching control signal Csw supplied from the voltage controller 120.

In an exemplary embodiment, but without limitation thereto, the switch SW may perform switching operation (i.e., turning on/off the switch) corresponding to the switching control signal Csw, for example.

In an exemplary embodiment, the switch SW may include a transistor, for example.

In an exemplary embodiment, but without limitation thereto, the switch SW may be turned on when a high-level switching control signal Csw is input, and turned off when a low-level switching control signal Csw is input, for example.

However, the invention is not limited thereto, and in another exemplary embodiment, the switch SW may be turned on when a low-level switching control signal Csw is input, and may be turned off when a high-level switching control signal Csw is input.

The voltage converter circuit 110 may include converters of various methods which include at least one switching device SW.

A form of the voltage converter circuit 110 may be described in detail with reference to FIGS. 3A to 3C.

The voltage controller 120 may control the voltage converter circuit 110. In an exemplary embodiment, but without limitation thereto, the voltage converter circuit 110 may be controlled in response to the first feedback voltage Vfb1 or the second feedback voltage Vfb2 selectively provided through the switch unit 150, for example.

That is, the voltage controller 120 may compare the first feedback voltage Vfb1 or the second feedback voltage Vfb2 with a predefined comparison voltage, and based upon the comparison, a pulse width of a switching control signal Csw may be controlled, thereby controlling a duty ratio of the switch SW included in the voltage converter circuit 110.

Accordingly, the voltage controller 120 may control the level of the output voltage Vout by reflecting the first feedback voltage Vfb1 or the second feedback voltage Vfb2.

The feedback terminal FB may provide the first feedback voltage Vfb1. In an exemplary embodiment, but without limitation thereto, the feedback terminal FB may be coupled to an external feedback wire 190 and may supply the first feedback voltage Vfb1 to the switch unit 150 from the external feedback wire 190, for example.

In an exemplary embodiment, but without limitation thereto, when the external voltage divider circuit 200 is installed on the output terminal OUT, the external feedback wire 190 may be coupled to the external voltage divider circuit 200, and when the external voltage divider circuit 200 is not installed, the external feedback wire 190 may be electrically coupled to the output terminal OUT, for example.

The internal voltage divider circuit 140 may provide the second feedback voltage Vfb2. In an exemplary embodiment, but without limitation thereto, the internal voltage divider circuit 140 may use the first feedback voltage Vfb1 to generate the second feedback voltage Vfb2, for example.

To this end, the switch unit 150 may supply the first feedback voltage Vfb1 transferred from the feedback terminal FB to the internal voltage divider circuit 140.

In an exemplary embodiment, but without limitation thereto, the internal voltage divider circuit 140 may include multiple resistors R1 and R2 that are mutually coupled in series, and by dividing the first feedback voltage Vfb1 through the resistors R1 and R2, the second feedback voltage Vfb2 may be generated, for example.

Accordingly, the second feedback voltage Vfb2 may be lower than the first feedback voltage Vfb1.

Here, the second feedback voltage Vfb2 may be output through a node Ni between the resistors R1 and R2.

Also, the second feedback voltage Vfb2 output from the internal voltage divider circuit 140 may be supplied to the switch unit 150 again.

The switch unit 150 may selectively transfer the first feedback voltage Vfb1 provided from the feedback terminal FB or the second feedback voltage Vfb2 provided from the internal voltage divider circuit 140 to the voltage controller 120.

In an exemplary embodiment, but without limitation thereto, in an external resistance mode that uses the external voltage divider circuit 200, the switch unit 150 may supply the first feedback voltage Vfb1 to the voltage controller 120, and in an internal resistance mode that uses the internal voltage divider circuit 140, the switch unit 150 may supply the second feedback voltage Vfb2 to the voltage controller 120, for example.

Also, the switch unit 150 may supply the first feedback voltage Vfb1 provided from the feedback terminal FB to the internal voltage divider circuit 140.

In an exemplary embodiment, but without limitation thereto, in the internal resistance mode, the switch unit 150 may transfer the first feedback voltage Vfb1 to the internal voltage divider circuit 140 such that the internal voltage divider circuit 140 may generate the second feedback voltage Vfb2, for example.

An operation of the switch unit 150 may be controlled by the feedback control signal Cfb supplied from the switch controller 160.

The switch unit 150 may include a first switch T1, a second switch T2 and a third switch T3 for the above-described operation.

The first switch T1 may be coupled between the voltage controller 120 and the feedback terminal FB.

Also, the first switch T1 may transfer the first feedback voltage Vfb1 to the voltage controller 120 when turned on.

The second switch T2 may be coupled between the feedback terminal FB and the internal voltage divider circuit 140.

Also, the second switch T2 may transfer the first feedback voltage Vfb1 to the internal voltage divider circuit 140 when turned on.

The third switch T3 may be coupled between the internal voltage divider circuit 140 and the voltage controller 120.

Also, the third switch T3 may transfer the second feedback voltage Vfb2 to the voltage controller 120 when turned on.

In an exemplary embodiment, but without limitation thereto, the second switch T2 and the third switch T3 may have a turn-on period and a turn-off period which are the same as each other, for example.

In an exemplary embodiment, the first switch T1 may be alternately turned on with the second switch T2 and the third switch T3.

In an exemplary embodiment, but without limitation thereto, in an external resistance mode, the first switch T1 may maintain an on-status, and the second switch T2 and the third switch T3 may maintain an off-status, for example. In an internal resistance mode, the first switch T1 may maintain the off-status, and the second switch T2 and the third switch T3 may maintain the on-status.

The switch controller 160 may control the switch unit 150. In an exemplary embodiment, but without limitation thereto, the switch controller 160 may control operation of the switch unit 150 by supplying the feedback control signal Cfb to the switch unit 150, for example.

Also, the switch controller 160 may compare the first feedback voltage Vfb1 with the reference voltage Vref by being input with the first feedback voltage Vfb1 of the feedback terminal FB and the predefined reference voltage Vref and may control the switch unit 150 based on the comparison.

In an exemplary embodiment, but without limitation thereto, the switch controller 160 may primarily compare the first feedback voltage Vfb1 with the reference voltage Vref, and when the first feedback voltage Vfb1 is greater than the reference voltage Vref, may control the switch unit 150 such that the second feedback voltage Vfb2 is transferred to the voltage controller 120, for example.

Also, the switch controller 160 may control the switch unit 150 such that the first feedback voltage Vfb1 is transferred to the internal voltage divider circuit 140.

That is, the switch controller 160 may, based on the first comparison of the first feedback voltage Vfb1 with the reference voltage Vref, when the first feedback voltage Vfb1 is greater than the reference voltage Vref, determine the first feedback voltage Vfb1 as an internal resistance mode, turn on the second switch T2 and the third switch T3 included in the switch unit 150 and turn off the first switch T1.

In the meantime, based on the comparison of the first feedback voltage Vfb1 with the reference voltage Vref, when the first feedback voltage Vfb1 is smaller than the reference voltage Vref, the switch controller 160 may supply a current Is to the feedback terminal FB using the current supply 180 and secondarily compare the first feedback voltage Vfb1 with the reference voltage Vref.

In an exemplary embodiment, but without limitation thereto, the switch controller 160 may supply a current supply signal Ci to the current supply 180, and the current supply 180 may supply a predefined current Is to the feedback terminal FB in response to the current supply signal Ci, for example.

Thereafter, based on the second comparison of the first feedback voltage Vfb1 with the reference voltage Vref, when the first feedback voltage Vfb1 is greater than the reference voltage Vref, the switch controller 160 may control the switch unit 150 such that the first feedback voltage Vfb1 is transferred to the voltage controller 120.

When there is the external voltage divider circuit 200, the current Is supplied to the feedback terminal FB flows to the resistor of the external voltage divider circuit 200 (e.g., Ro2), and accordingly, the first feedback voltage Vfb1 may increase.

That is, when the first feedback voltage Vfb1 is greater than the reference voltage Vref, the voltage controller 120 may determine that there is the external voltage divider circuit 200 and determine the current mode as the external resistance mode.

Accordingly, the switch controller 160 may turn on the first switch T1 included in the switch unit 150 and turn off the second switch T2 and the third switch T3 such that the first feedback voltage Vfb1 of the feedback terminal FB is transferred directly to the voltage controller 120.

Based on the second comparison of the first feedback voltage Vfb1 with the reference voltage Vref, when the first feedback voltage Vfb1 is smaller than the reference voltage Vref, the switch controller 160 may control the switch unit 150 such that the second feedback voltage Vfb2 is transferred to the voltage controller 120.

When there is no external voltage divider circuit 200, even when a predefined current Is is supplied to the feedback terminal FB, the first feedback voltage Vfb1 may not greatly change.

Therefore, in this case, since the first feedback voltage Vfb1 becomes smaller than the reference voltage Vref, the voltage controller 120 may determine that there is no external voltage divider circuit 200, and may determine the current mode as the internal resistance mode.

Therefore, the switch controller 160 may turn on the second switch T2 and the third switch T3 included in the switch unit 150 and turn off the first switch T1 such that the second feedback voltage Vfb2 of the internal voltage divider circuit 140 is transferred to the voltage controller 120.

The current supply 180 may supply the predefined current Is to the feedback terminal FB. In an exemplary embodiment, but without limitation thereto, the current supply 180 may supply the predefined current Is to the feedback terminal FB when the current supply 180 is supplied with a current supply signal Ci, for example.

Here, the first switch T1 and the second switch T2 included in the switch unit 150 may be turned off such that the current Is output from the current supply 180 may not flow to the voltage controller 120 and the internal voltage divider circuit 140.

Figure 3A:
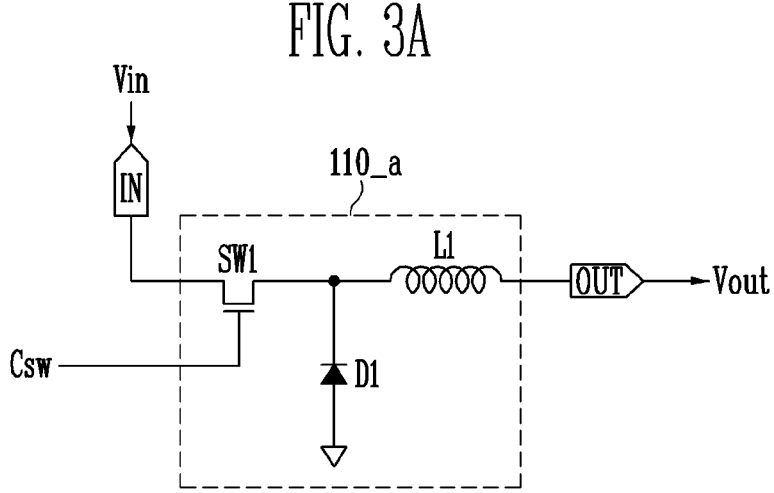
FIGS. 3A to 3C illustrate various embodiments of a voltage divider circuit.
Figure 3B:
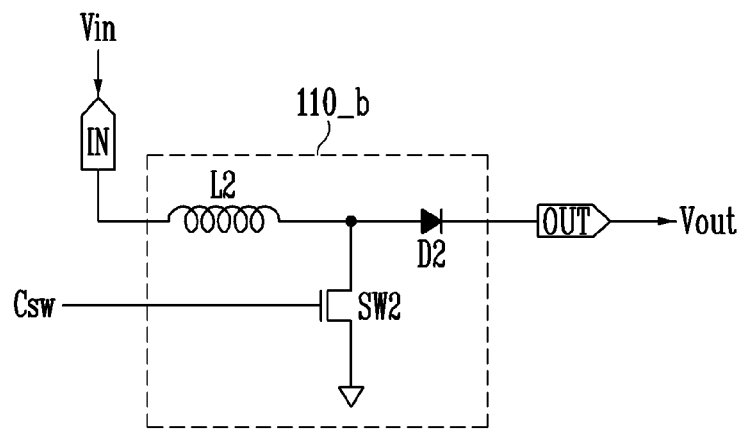
Figure 3C:
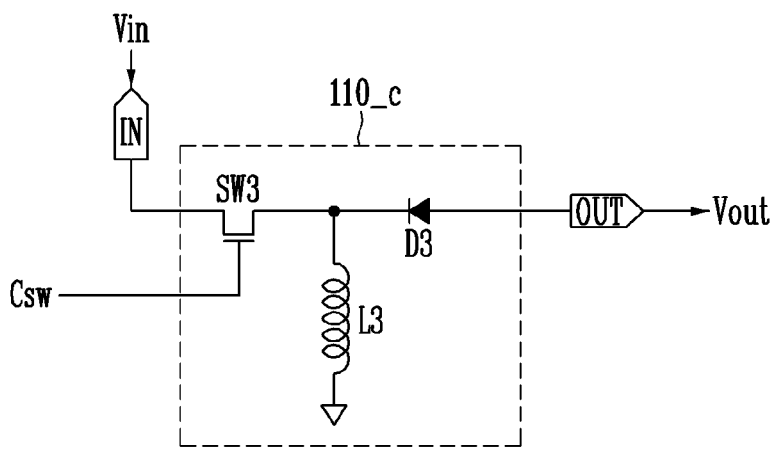

FIGS. 3A to 3C illustrate various embodiments of a voltage divider circuit.

A voltage converter circuit 110 according to an exemplary embodiment may include non-isolated converters 110_a, 110_b and 110_c respectively shown in FIGS. 3A to 3C.

In an exemplary embodiment, but without limitation thereto, referring to FIG. 3A, the voltage converter circuit 110_a according to an exemplary embodiment may be a buck converter including a switch SW1, an inductor L1 and a diode D1, for example.

Here, regarding the switch SW1, on-off operations may be controlled by a switching control signal Csw and the switch SW1 may include a transistor.

Referring to FIG. 3B, a voltage converter circuit 110_b according to another embodiment may be a boost converter including a switch SW2, an inductor L2 and a diode D2.

Here, regarding a switch SW2, on-off operations may be controlled by the switching control signal Csw, and the switch SW2 may include a transistor.

Also, referring to FIG. 3C, a voltage converter circuit 110_c according to another embodiment may be a buck-boost converter including a switch SW3, an inductor L3 and a diode D3.

Here, regarding the switch SW3, on-off operations may be controlled by the switching control signal Csw, and the switch SW3 may include a transistor.

A voltage converter circuit 110 (refer to FIG. 2) capable of being adopted in an exemplary embodiment is not limited to the above-described embodiment, and a converter in various forms which includes at least one switch SW may be adopted.

Figure 4:
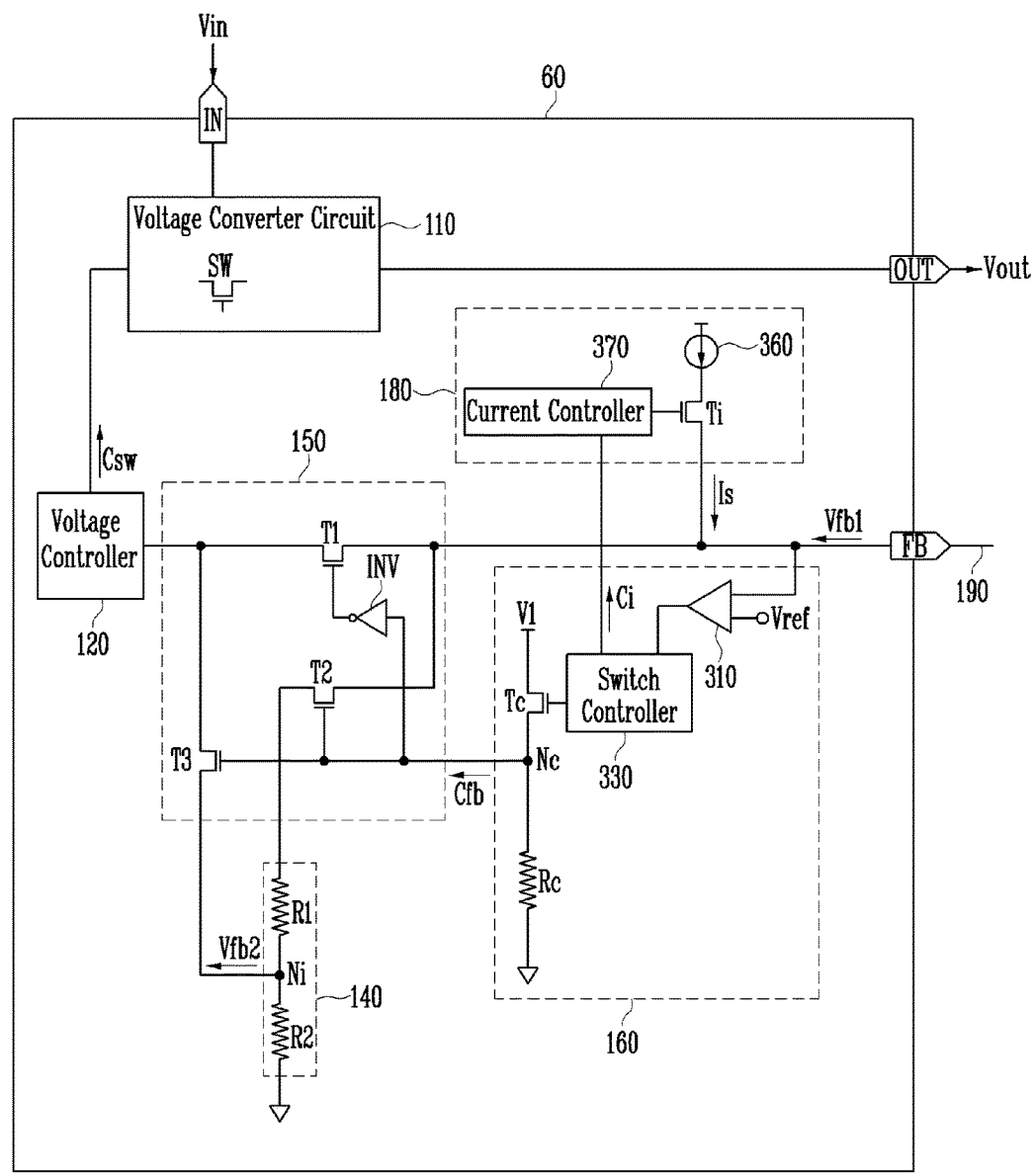
FIG. 4 illustrates further in detail an exemplary embodiment of a switch unit, a switch controller and a current supply according to the invention.

FIG. 4 illustrates further in detail a switch unit, a switch controller and a current supply according to an exemplary embodiment.

Referring to FIG. 4, a switch unit 150 according to an exemplary embodiment may include a first switch T1, a second switch T2, a third switch T3 and an inverter INV.

Also, FIG. 4 shows an example of the first switch T1, the second switch T2 and the third switch T3 being implemented with the same type.

The interrelationship between each switch T1, T2 and T3 may be described based on the above. Regarding the first switch T1, a first electrode may be coupled to the voltage controller 120, a second electrode may be coupled to the feedback terminal FB, and a control electrode may be coupled to the output terminal of an inverter INV.

Also, in the second switch T2, a first electrode may be coupled to the internal voltage divider circuit 140, a second electrode may be coupled to the feedback terminal FB, and a control electrode may be coupled to the switch controller 160.

In the third switch T3, a first electrode may be coupled to the voltage controller 120, a second electrode may be coupled to the internal voltage divider circuit 140, and a control electrode may be coupled to the switch controller 160.

Particularly, the second electrode of the third switch T3 may be coupled to an output node Ni of the internal voltage divider circuit 140 that outputs the second feedback voltage Vfb2.

Regarding the inverter INV, the output terminal may be coupled to the control electrode of the first switch T1, and the input terminal may be coupled to a switch controller 160.

Here, the first electrode may be set to be any one of the source electrode and the drain electrode, and the second electrode is set to be an electrode that is different from the first electrode. In an exemplary embodiment, but without limitation thereto, when the first electrode is set to be a source electrode, the second electrode may be set to be a drain electrode. Also, the control electrode may be set to be a gate electrode, for example.

The switch controller 160 according to an exemplary embodiment may include a comparator 310, a control switch Tc and a switch driver 330.

The comparator 310 may compare the first feedback voltage Vfb1 of the feedback terminal FB with the reference voltage Vref and announce the comparison result to the switch driver 330.

In an exemplary embodiment, but without limitation thereto, when the first feedback voltage Vfb1 is greater than the reference voltage Vref, a first result signal may be output, and when a first feedback voltage Vfb1 is smaller than the reference voltage Vref, a second result signal that is different from the first result signal may be output, for example.

The control switch Tc may output a feedback control signal Cfb having a high level voltage (e.g., a first voltage V1) to the switch unit 150 when turned on.

To this end, the control switch Tc may be coupled to the power source that provides the first voltage V1.

In an exemplary embodiment, but without limitation thereto, the control switch Tc may include a transistor, and in this case, a first electrode of the control switch Tc is coupled to the power source that supplies the first voltage V1, for example. A second electrode may be coupled to a resistor Rc, and a control electrode may be coupled to a switch driver 330.

Accordingly, when the control switch Tc is turned on, a feedback control signal Cfb having a high level voltage may be output from the node Nc between the control switch Tc and the resistor Rc.

When the feedback control signal Cfb having a high level voltage is output from the switch controller 160, the second switch T2 and the third switch T3 included in the switch unit 150 may be turned on.

Here, since the inverter INV outputs a low level voltage, the first switch T1 may be turned off.

When the control switch Tc is turned off, the feedback control signal Cfb having a low level voltage (e.g., a ground voltage) is output from the switch controller 160, the second switch T2 and the third switch T3 may be turned off.

Here, since the inverter INV outputs a high level voltage, the first switch T1 may be turned on.

The switch driver 330 may control an on-off state of the control switch Tc based on the comparison result of the comparator 310.

Also, the switch driver 330 may, based on the comparison result, supply a current supply signal Ci to a current controller 370 of the current supply unit 180.

The current supply 180 according to an exemplary embodiment may include a current source 360, a current control switch Ti, and a current controller 370.

The current source 360 may provide a predefined current Is.

The current control switch Ti may supply the current Is provided from the current source 360 when turned on to the feedback terminal FB.

To this end, the current control switch Ti may be coupled between the current source 360 and the feedback terminal FB.

In an exemplary embodiment, but without limitation thereto, the current control switch Ti may include a transistor, and in this case, a first electrode of the current control switch Ti may be coupled to the current source 360, a second electrode may be coupled to the feedback terminal FB, and a control electrode may be coupled to the current controller 370, for example.

The current controller 370 may control an on-off state of the current control switch Ti by referring to the comparison result of the first feedback voltage Vfb1 and the reference voltage Vref by the switch controller 160.

In an exemplary embodiment, but without limitation thereto, when the current controller 370 is input with a current supply signal Ci from the switch controller 160, the current controller 370 may supply the predefined current Is to the feedback terminal FB by turning on the control switch Tc, for example.

Hereinafter, detailed operations of the switch unit 150, the switch controller 160 and the current supply 180 will be examined.

First, based on the first comparison of the first feedback voltage Vfb1 with the reference voltage Vref by the comparator 310, when the first feedback voltage Vfb1 is greater than the reference voltage Vref, the switch driver 330 may determine an internal resistance mode and turn on the control switch Tc.

Accordingly, the second switch T2 and the third switch T3 of the switch unit 150 may be turned on, and the second feedback voltage Vfb2 of the internal voltage divider circuit 140 may be supplied to the voltage controller 120.

In the meantime, based on the first comparison of the first feedback voltage Vfb1 with the reference voltage Vref by the comparator 310, when the first feedback voltage Vfb1 is smaller than the reference voltage Vref, the switch driver 330 may supply the current supply signal Ci to the current controller 370 of the current supply 180.

Accordingly, the current controller 370 may supply the current Is provided from the current source 360 to the feedback terminal FB by turning on the current control switch Ti.

Thereafter, based on the second comparison of the first feedback voltage Vfb1 with the reference voltage Vref by the comparator 310, when the first feedback voltage Vfb1 is greater than the reference voltage Vref, the switch driver 330 may determine an external resistance mode and turn off the control switch Tc.

Accordingly, as the first switch T1 of the switch unit 150 is turned on, the first feedback voltage Vfb1 of the feedback terminal FB may be supplied to the voltage controller 120.

Based on the second comparison of the first feedback voltage Vfb1 with the reference voltage Vref by the comparator 310, when the first feedback voltage Vfb1 is smaller than the reference voltage Vref, the switch driver 330 may determine an internal resistance mode and turn on the control switch Tc.

Accordingly, the second switch T2 and the third switch T3 of the switch unit 150 may be turned on, and the second feedback voltage Vfb2 of the internal voltage divider circuit 140 may be supplied to the voltage controller 120.

Figure 5:
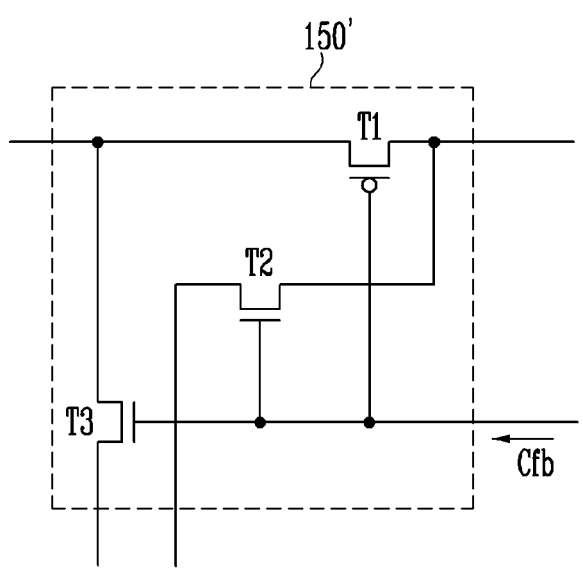

FIG. 5 illustrates a switch unit according to another embodiment.

Referring to FIG. 5, in a switch unit 150' according to another embodiment, an inverter INV may be omitted compared to the switch unit 150 shown in FIG. 4.

To this end, a first switch T1 may include a transistor having a different channel type from a second switch T2 and a third switch T3.

In an exemplary embodiment, but without limitation thereto, the first switch T1 may include a P-type transistor, and the second switch T2 and the third switch T3 may include an N-type transistor, for example.

When a switch controller 160 outputs a feedback control signal Cfb having a high level voltage, the second switch T2 and the third switch T3 may be turned on, and the first switch T1 may be turned off.

Also, when the switch controller 160 outputs a feedback control signal Cfb having a low-level voltage, the first switch T1 may be turned on, and the second switch T2 and the third switch T3 may be turned off.

In an alternative exemplary embodiment, the first switch T1 may include an N-type transistor, and the second switch T2 and the third switch T3 may include a P-type transistor.

Figure 6:
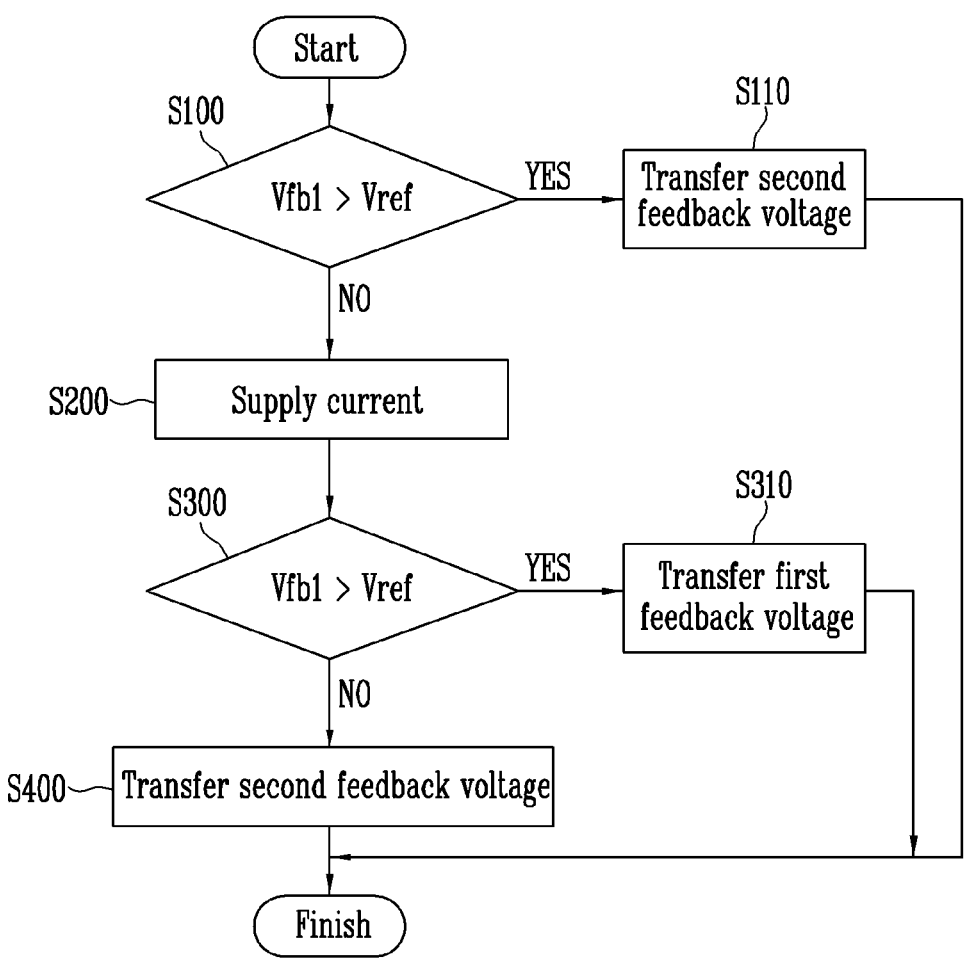
FIG. 6 is a flow chart for describing an exemplary embodiment of a method of driving a power supply according to the invention.

FIG. 6 is a flow chart for describing a method of driving a power supply according to an exemplary embodiment.

Referring to FIG. 6, in a method of driving a power supply according to an exemplary embodiment, a first comparison operation (S100) may be performed first.

In the first comparison operation (S100), a first feedback voltage Vfb1 of the feedback terminal FB and a reference voltage Vref may be compared primarily.

Based on the comparison in the first comparison operation (S100), when it is determined that the first feedback voltage Vfb1 is greater than the reference voltage Vref, an operation of transferring a second feedback voltage Vfb2 to the voltage controller 120 may be performed (S110).

In the operation of transferring the second feedback voltage Vfb2 to the voltage controller 120 (S110), before the first comparison operation (S100) is performed again, the second feedback voltage Vfb2 may be continuously supplied to the voltage controller 120.

To this end, in the operation (S110), before the first comparison operation (S100) is performed again subsequently, the second switch T2 and the third switch T3 may maintain an on-status, and the first switch T1 may maintain an off-status.

Based on the first comparison operation (S100), when it is determined that the first feedback voltage Vfb1 is smaller than the reference voltage Vref, an operation of supplying a predefined current Is to the feedback terminal FB may be performed (S200).

To this end, in the operation (S200), the current supply 180 may supply a predefined current Is to the feedback terminal FB.

After the operation of supplying the predefined current Is to the feedback terminal FB (S200), a second comparison operation (S300) secondarily comparing the first feedback voltage Vfb1 of the feedback terminal FB with the reference voltage Vref may be performed.

Based on the comparison from the second comparison operation (S300), when it is determined that the first feedback voltage Vfb1 is greater than the reference voltage Vref, an operation (S310) of transferring the first feedback voltage Vfb1 to the voltage controller 120 may be performed.

In the operation (S310) of transferring the first feedback voltage Vfb1 to the voltage controller 120, before the first comparison operation (S100) is performed again subsequently, the first feedback voltage Vfb1 may be continuously supplied to the voltage controller 120.

To this end, in the operation (S310), before the first comparison operation (S100) is performed again subsequently, the second switch T2 and the third switch T3 may maintain an off-status, and the first switch T1 may maintain an on-status.

Based on the comparison from the second comparison operation (S300), when it is determined that the first feedback voltage Vfb1 is smaller than the reference voltage Vref, an operation (S400) of transferring the second feedback voltage Vfb2 to the voltage controller 120 may be performed.

In an operation (S400) of transferring the second feedback voltage Vfb2 to the voltage controller 120, before the first comparison operation (S100) is performed again subsequently, the second feedback voltage Vfb2 may be continuously supplied to the voltage controller 120.

To this end, in the operation (S400), before the first comparison operation (S100) is performed again subsequently, the second switch T2 and the third switch T3 may maintain an on-status, and the first switch T1 may maintain an off-status.

By way of summation and review, in an exemplary embodiment, a power supply is provided which is capable of detecting when there is an external voltage divider circuit.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:

1. A power supply comprising:
   a voltage converter circuit which converts an input voltage into an output voltage and outputs the output voltage;
   a voltage controller which controls the voltage converter circuit in response to one of a first feedback voltage and a second feedback voltage;
   a feedback terminal which supplies the first feedback voltage;
   an internal voltage divider circuit which supplies the second feedback voltage; and
   a switch unit which comprises:
      a first switch and a second switch respectively transferring the first feedback voltage and the second feedback voltage and selectively transfers the one of the first feedback voltage and the second feedback voltage to the voltage controller, and
      a third switch which is coupled to a node between the feedback terminal and the first switch and to the internal voltage divider circuit and transfers the first feedback voltage to the internal voltage divider circuit when turned on.

2. The power supply as claimed in claim 1, further comprising a switch controller which compares the first feedback voltage with a reference voltage and controls the switch unit based on a comparison result.

3. The power supply as claimed in claim 2, further comprising a current supply which supplies a current to the feedback terminal.

4. The power supply as claimed in claim 3, wherein the current supply comprises:
   a current source which supplies a current;
   a current control switch which transfers a current supplied from the current source to the feedback terminal when turned on; and
   a current controller which controls an on-off state of the current control switch referring to a comparison result by the switch controller.

5. The power supply as claimed in claim 3, wherein the switch controller compares the first feedback voltage with the reference voltage primarily, and when the first feedback voltage is greater than the reference voltage, controls the switch unit such that the second feedback voltage is transferred to the voltage controller.

6. The power supply as claimed in claim 5, wherein the switch controller supplies a current to the feedback terminal using the current supply when the first feedback voltage is smaller than the reference voltage, compares the first feedback voltage with the reference voltage secondarily, controls the switch unit such that the first feedback voltage is transferred to the voltage controller when the first feedback voltage is greater than the reference voltage, and controls the switch unit such that the second feedback voltage is transferred to the voltage controller when the first feedback voltage is smaller than the reference voltage.

7. The power supply as claimed in claim 6, wherein
   the first switch is coupled between the voltage controller and the feedback terminal and transfers the first feedback voltage to the voltage controller when turned on; and
   the second switch is coupled between the internal voltage divider circuit and the voltage controller and transfers the second feedback voltage to the voltage controller when turned on.

8. The power supply as claimed in claim 7, wherein the switch controller further comprises:
   a comparator which compares the first feedback voltage with the reference voltage;
   a control switch which supplies a feedback control signal having a first voltage to the switch unit when turned on; and
   a switch driver which controls an on-off state of the control switch based on the comparison result of the comparator.

9. The power supply as claimed in claim 2,
   wherein the switch unit transfers the first feedback voltage to the internal voltage divider circuit,
   wherein the internal voltage divider circuit generates the second feedback voltage using the first feedback voltage.

10. The power supply as claimed in claim 9, wherein the second feedback voltage is lower than the first feedback voltage.

11. A method for driving a power supply, the method comprising:

performing a first comparison between a first feedback voltage of a feedback terminal and a reference voltage primarily; and transferring a second feedback voltage to a voltage controller when the first feedback voltage is greater than the reference voltage based on the first comparison;

supplying a current to the feedback terminal when the first feedback voltage is smaller than the reference voltage based on the first comparison;

performing a second comparison between the first feedback voltage and the reference voltage secondarily after the current is supplied to the feedback terminal; and transferring the first feedback voltage to the voltage controller when the first feedback voltage is greater than the reference voltage based on the second comparison.

12. The method as claimed in claim 11, further comprising transferring the second feedback voltage to the voltage controller when the first feedback voltage is smaller than the reference voltage based on the second comparison.

13. The method as claimed in claim 11, wherein the second feedback voltage is generated through a voltage divider circuit, wherein the voltage divider circuit includes resistors coupled in series and receives the first feedback voltage.

14. The method as claimed in claim 13, wherein the second feedback voltage is lower than the first feedback voltage.

* * * * *